H. G. WERNIMONT.
COUPLING OR SNAP.
APPLICATION FILED JAN. 16, 1919.
1,337,577.
Patented Apr. 20, 1920.
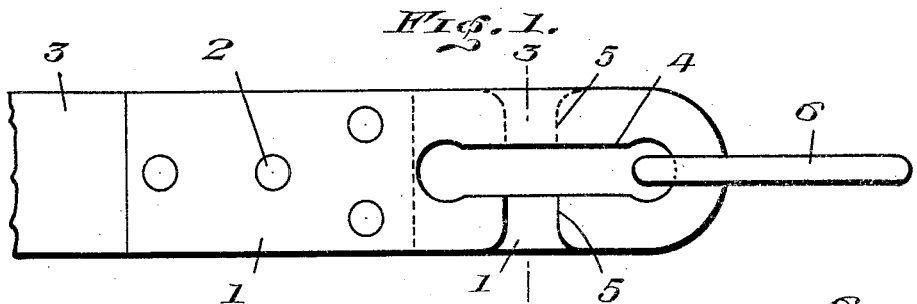
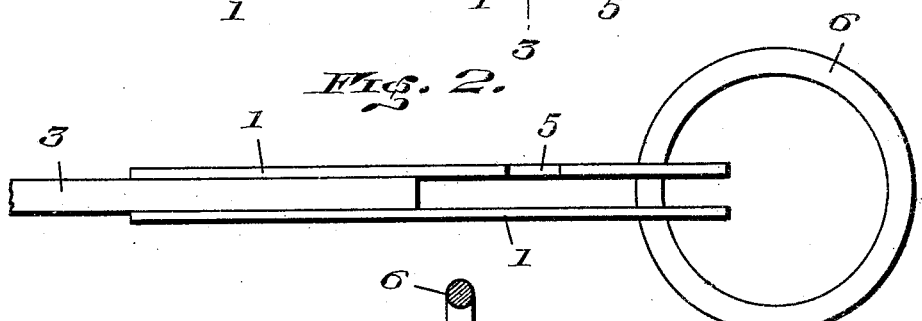
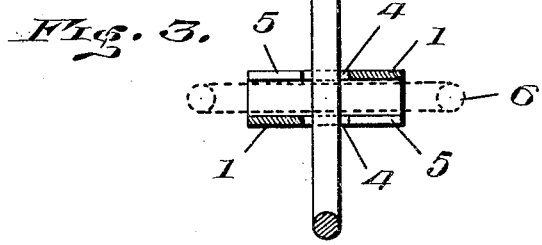
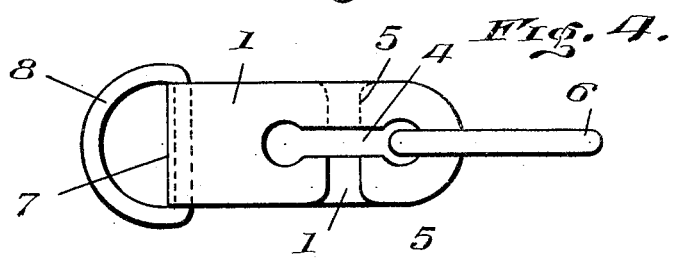
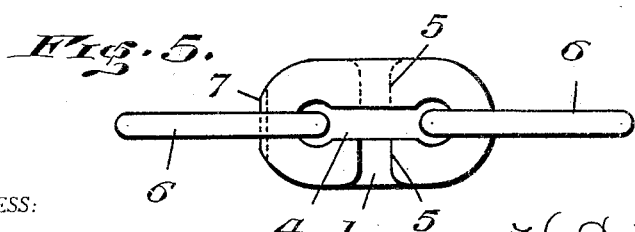
WITNESS:
Thos. W. Riley
INVENTOR.
H. G. Wernimont
BY
W. J. Fitz Gerald & Co.
ATTORNEYS.

UNITED STATES PATENT OFFICE.

HENRY G. WERNIMONT, OF WASHINGTON, DISTRICT OF COLUMBIA.

COUPLING OR SNAP.

1,337,577.     Specification of Letters Patent.     Patented Apr. 20, 1920.

Application filed January 16, 1919. Serial No. 271,389.

*To all whom it may concern:*

Be it known that I, HENRY G. WERNIMONT, a citizen of the United States, residing at Washington, in the District of Columbia, have invented certain new and useful Improvements in Couplings or Snaps; and I do hereby declare the following to be a full, clear, and exact description of the invention, such as will enable others skilled in the art to which it appertains to make and use the same.

The present invention relates to couplings or snaps, such as are used for detachably connecting two parts, and it is the object of the invention to provide a novel and improved coupling or snap that can be used as a trace or tug connection, buckle, hammock hook, and for many other purposes.

It is the object of the invention to provide such a coupling or snap, which although it can be readily put together and taken apart manually, will not be capable of accidental detachment, even though the coupling is shaken about or subjected to rough usage.

A further object is the provision of a coupling which can be readily and inexpensively manufactured from sheet metal or other stock, but nevertheless being thoroughly efficient and practical in use.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a plan view of the coupling as used on the end of a trace, tug or similar strap.

Fig. 2 is an edge view thereof.

Fig. 3 is a cross section on the line 3—3 of Fig. 1, showing the manner of disconnecting and connecting the parts.

Fig. 4 is a plan view of a modification, such as used as a hammock hook or the like.

Fig. 5 is a similar view of another variation which can be used generally as a coupling for two rings or the like.

Referring particularly to Figs. 1, 2 and 3, the coupling or snap shown therein comprises a pair of parallel strips or elongated plates 1. As shown, these are secured by rivets 2 or otherwise on the end of a trace, tug or strap 3, when the invention is used as a means for connecting a trace, tug or other strap to another part. The plates 1 project from the strap 3 and the projecting portions are provided with complementing or coinciding longitudinal slots 4, and each plate 1 is provided with a transverse entrance slot 5 extending from the slot 4 between the ends thereof to one longitudinal edge of the plate. The plates 1 are right and left handed, being of the same form but in reversed positions, so that the slot 5 on one plate is at one side and the slot 5 of the other plate at the opposite side or edge. Thus, each plate 1 extends across the slot 5 of the other plate, to prevent the ring 6 which engages through the slots 4 from accidentally moving through either of the slots 5. The slots 4 with the slots 5 form hooks at the projecting ends of the plates 1, as will be apparent, the two hooks being in reversed positions so that the bills are in overlapping spaced relation. The two slots 5 are in transverse alinement, to permit the ring 6 and plates 1 to be separated by a predetermined manual manipulation, as will be described presently. The ends of the longitudinal slots are all closed and terminate beyond the transverse slots between the edges and within the outlines of the plates so that a ring can not move out of the longitudinal slots at either end thereof.

To separate the parts, the plates 1 and ring 6 are moved together longitudinally, to bring that part of the ring 6 which is within the slots 4 between the slots 5, and the ring and plates are then turned from the full line position as seen in Fig. 3, at right angles with one another, to a position in substantially the same plane as indicated in dotted lines in Fig. 3. By thus turning the parts transversely, the ring 6 moves or swings through both slots 5 to bring said ring between the plates or tongues 1 as seen in dotted lines, thus enabling the ring and plates to be readily pulled apart. Conversely, the parts can be readily assembled by first moving the ring 6 between the plates 1 in parallel relation, and, when the parts are in proper position, then swinging the ring and plates transversely to move the ring through the slots 5 into the slots 4.

The ring 6 can then move longitudinally within the slots 4 and the parts can be shaken about without fear of accidental detachment, it being noted that to detach the parts, the ring and plates must be shifted longitudinally to a predetermined position of the ring between the ends of the slots 4, so that the relative transverse swinging movement of the parts, moves the ring 6 through the slots 5 for separation. This is not apt to occur accidentally it being noted that the hook of each plate 1 extends across the slot 5 of the opposite plate, so that there is no tendency for the ring 6 moving through either slot 5 especially in view of the fact the plates 1 are spaced apart a distance substantially the same or only slightly greater than the thickness of the ring 1, in order that said ring must be swung through both slots 5 at the same time for disconnection. The corners of the plates 1 at the outer ends or mouths of the slots 5 are preferably rounded off to facilitate the assemblage and separation of the parts, and it is of course understood that various forms and sizes of rings can be connected to the plates 1. In using the device as a trace or tug coupling, the ring 6 is secured to the swingletree, or hame and the plates 1 enable the tug or trace to be readily attached to and disconnected from the ring, without danger of accidental disconnection.

Fig. 4 illustrates a modification in that the plates 1 comprise a single piece of metal which is doubled longitudinally on a transverse line, so as to have a bend 7 for holding a ring or loop 8 that may be used for supporting a hammock.

Fig. 5 shows a similar coupling having the bend 7 between the plates 1, which are of one piece, and showing two rings 6 in the slots 4, each of which can be disconnected from the coupling. This depicts the use of device as a coupling for chains and other devices.

Having thus described the invention, what is claimed as new is:—

A coupling for the engagement of a ring, comprising spaced parallel plates having coinciding longitudinal slots for receiving a ring, each plate having a transverse slot extending at right angles from the longitudinal slot to one side edge of the plate, the two transverse slots of the plates being opposite to one another and in transverse alinement, and said slots being located midway between the ends of the longitudinal slots, and the ends of the longitudinal slots all being closed and terminating beyond the transverse slots between the edges of the plates, so that the ring can be moved to either end of the longitudinal slots without detachment, thereby requiring the ring and plates to be held in a fixed relative longitudinal position with the ring midway between the ends of the longitudinal slots for attaching or detaching the plates and ring by a lateral movement.

In testimony whereof I have signed my name to this specification.

HENRY G. WERNIMONT.